United States Patent [19]

Leveque et al.

[11] Patent Number: 4,964,997

[45] Date of Patent: Oct. 23, 1990

[54] LIQUID/LIQUID EXTRACTION OF RARE EARTH/COBALT VALUES

[75] Inventors: Alain Leveque, La Rochelle; Richard Fitoussi, Saint-Mande; Jean-Louis Sabot, Maisons Laffitte, all of France

[73] Assignee: Rhone-Poulenc Chimie, Courbevoie, France

[21] Appl. No.: 312,485

[22] Filed: Feb. 21, 1989

[30] Foreign Application Priority Data

Feb. 19, 1988 [FR] France .................................. 88 01981

[51] Int. Cl.$^5$ ............................................. B01D 11/04
[52] U.S. Cl. ..................................... 210/634; 423/21.5
[58] Field of Search ............... 210/634, 511; 423/21.5, 423/139, 10; 75/101 BE

[56] References Cited

U.S. PATENT DOCUMENTS 4,461,748  7/1984  Sabot et al. ................... 423/21.5 X Primary Examiner—Frank Spear
Attorney, Agent, or Firm—Burns, Doane, Swecker & Mathis

[57] ABSTRACT

Rare earth and cobalt values are separated and recovered from residue materials containing them, e.g., the waste residue from the production of samarium/cobalt magnets, by (a) dissolving such residues with nitric acid, (b) liquid/liquid extracting the resulting aqueous nitric phase with an organic phase including at least one water-insoluble neutral organophosphoric extractant, whereby the rare earth values are transferred into the organic phase, and (c) recovering the rare earth values from the organic phase.

22 Claims, 1 Drawing Sheet

LIQUID/LIQUID EXTRACTION OF RARE EARTH/COBALT VALUES

CROSS-REFERENCE TO COMPANION APPLICATION

Copending application, Ser. No. 07/312,486, filed concurrently herewith and assigned to the assignee hereof.

BACKGROUND OF THE INVENTION

1. Field of the Invention:

The present invention relates to the treatment of residue materials containing rare earth and cobalt values, and, more especially, to the recovery of samarium and cobalt values from waste products resulting from the production of magnets.

2. Description of the Prior Art:

At the present time, the development of alloys based on the rare earths, in particular samarium/cobalt alloys, as permanent magnets, is of significant interest.

The rare earths, in particular samarium, are expensive raw materials; it is thus important to recover these values from all of the residues of the manufacture of magnets.

Different processes are known to this art for the treatment of such residues. Some of these operate by selective precipitation after the acid decomposition of the residue (JP-A 61/000533, JP-A 61/000532, JP-A 54/089904), while others treat the solution obtained after the acid attack, by electrolysis, to recover the cobalt (JP-A 59/067384).

In JP-A 60/122718, a process is described for the recovery of samarium from a particular residue by dissolving such residue in an organic phase containing an extraction agent, such as a dialkylphosphoric acid, in particular di-(2-ethylhexyl) phosphoric acid, and then extracting the samarium from the organic phase into an aqueous phase, by means of a concentrated acid solution having a normality ranging from 1 to 5 N, preferably from 2 to 5 N. The process has the disadvantage of a difficult back-extraction of the samarium values, at the time of the regeneration of the solvent of extraction, giving rise to high operating costs.

SUMMARY OF THE INVENTION

Accordingly, a major object of the present invention is the provision of an improved process for the recovery of rare earth values from a residue of a rare earth extraction process comprising a solution obtained after acid decomposition, which improved process permits the treatment of solutions having higher metal concentrations and which does not require, or requires but a slight amount of an acid at the stage of back-extraction, resulting in a far more economical process.

Briefly, the present invention features a process for the treatment of a residue material containing at least one rare earth and cobalt, comprising:

(a) dissolving the residue with nitric acid;

(b) separating the rare earth or earths by liquid/liquid extraction, by contacting an aqueous nitric acid phase containing the elements to be separated with a organic phase containing a rare earth extraction agent which comprises at least one neutral organophosphoric compound; and (c) then recovering the rare earth or earths from the organic phase.

BRIEF DESCRIPTION OF THE DRAWINGS

The FIGURE of Drawing is a schematic/diagrammatic representation of suitable process/apparatus according to the invention.

DETAILED DESCRIPTION OF THE PREFERRED EMBODIMENTS OF THE INVENTION

Figure 1:
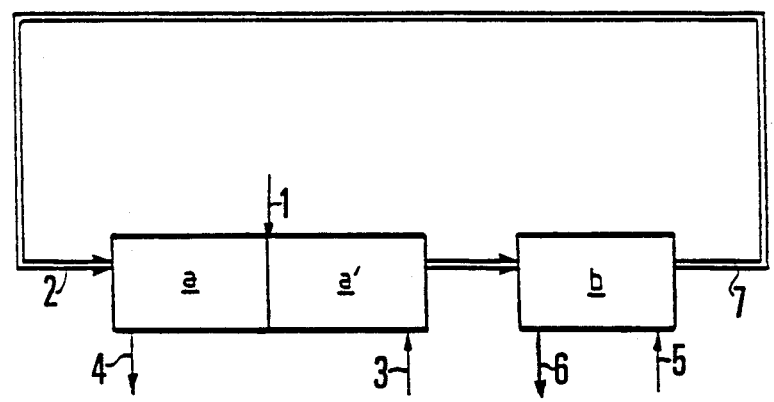

More particularly according to the present invention, the residue materials treated hereby are wastes of any form (powders, chips, ingot fragments, dust, fines, etc.), which most typically result from the manufacture of magnets of the type of $SmCo_5$, $Sm_2Co_{17}$, $RECo_5$ or $RE_2Co_{17}$.

By the expression "rare earth" (RE) as utilized herein are intended the rare earth elements designated lanthanides and having atomic numbers of from 57 to 71 and including yttrium, having an atomic number of 39.

The residues treated may also contain lesser or greater amounts of other metallic elements and perhaps certain metalloids. Generally, impurities comprising transition metals, most typically iron, copper, nickel, and also metals such as manganese and titanium, are present. It is possible that alkali or alkaline earth metals, for example sodium, calcium, etc., may also be present.

The proportion of rare earths and cobalt in such residues varies over wide limits.

The residues may have a percentage, by weight, of rare earths ranging from 10% to 50%, of cobalt from 30% to 80%, the complement to 100% comprising the impurities, which most often do not exceed 25% by weight of the residue.

It will be appreciated that the values mentioned above are not critical and are given solely as exemplary.

It will also be appreciated that it is within the ambit of this invention to utilize the subject process for the recovery of rare earths and cobalt from any industrial residue, in the solid, pasty, etc., form. Thus, the treatment of sludges or machining powders, and the like, are specifically envisaged.

The process of the invention is particularly well suited for the treatment of the residues resulting from the manufacture of samarium/cobalt magnets, with a view towards recovering the samarium and cobalt values.

According to the invention, in a first stage of the process, the residue to be treated is solubilized with nitric acid.

Prior to the acid decomposition, a crushing or grinding operation may be advantageous, as it is desirable that the residue to be treated be in a divided state. Indeed, the dimension of the particles subjected to acid attack is not a critical factor according to the invention; however, if a rather rapid decomposition is desired, it is advantageous to us particles having a fine grain size distribution, preferably having diameters less than 10 mm. In particular, particles having diameters of less than 2 mm are easier to use.

After this optional operation, the residue is decomposed with nitric acid. Concentrated or dilute nitric acid may be used.

The amount of nitric acid used is preferably equal to at least the stoichiometric amount, with respect to the elements to be solubilized.

Good conditions are obtained when nitric acid is used in an excess of 25% to 30% relative to the stoichiometric amount.

The conditions of the decomposition also depend on the nature of the residue to be treated, the concentration of the acid and the temperature selected.

Good decomposition conditions are generally obtained if the attack is carried out using a nitric acid having a normality of from 6 to 15 N, and at a temperature ranging from 15° to 100° C.

The aqueous solution of the nitrates of the different metallic elements resulting from the decomposition stage may be used, as such, or they may be concentrated by evaporation or diluted with water.

Generally, the liquid/liquid extraction process is carried out on a solution emanating from the nitric acid decomposition stage and having a total nitrate ion concentration of from 100 to 600 g/l, with these limits not being critical. Preferably, this concentration ranges from 300 to 600 g/l.

Prior to the separation stage, it may be necessary to separate a residue of insolubles, namely, impurities which are not decomposed by conventional solid/solid separation methods, preferably by filtration.

The next stage of the process entails separating the rare earth or earths from the other metallic elements, by liquid/liquid extraction, by contacting the aqueous solution of decomposition with an organic phase containing, as the extractant, a neutral organophosphoric compound.

The extraction is carried out using a neutral organophosphoric extractant essentially insoluble in water and selected from among those having the following formulae:

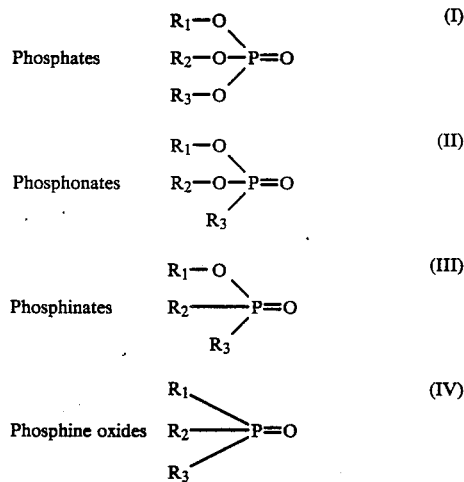

wherein $R_1$, $R_2$ and $R_3$ are hydrocarbon radicals, such as aliphatic, cycloaliphatic and/or aromatic radicals.

These radicals may contain 1 to 18 carbon atoms, but preferably at least one of the radicals should have 4 carbon atoms.

The extractants of Formulae (I) to (IV) may be used alone or in mixtures.

Among these compounds, particularly preferred are those that are commercially available, such as tri-n-butylphosphate (TBP), tri-isobutylphosphate (TIBP), dibutylbutylphosphonate (DBBP), di(2-ethylhexyl)-2-ethylhexylphosphonate (DEHEHP), tri-n-octylphosphine oxide (TOPO).

In the process of the invention, tributylphosphate is preferred.

The organic phase according to the invention optionally may contain, in addition to the extractant, an organic diluent. Exemplary diluents are those customarily used to carry out liquid/liquid extraction operations. Representative are aliphatic hydrocarbons, such as, for example, dodecane and petroleum fractions of the kerosene type, as are the aromatic hydrocarbons, such as, for example, the petroleum fractions consisting of mixtures of alkylbenzenes, in particular fractions of the Solvesso type marketed by the EXXON Co.

A mixture of these diluents may also be used.

Preferably, petroleum fractions of the kerosene type are used.

The proportion of the extraction agent in the organic phase may vary over wide limits.

Its concentration may range from 5% by volume, if the extraction agent is in solution in a diluent, to about 100%, if the agent is used pure.

A proportion of from 50% to 80% is advantageous if tributylphosphate is used, which is the preferred extractant of the invention.

The organic phase according to the invention may also contain different modifiers, one of the essential objectives of which is to improve the hydrodynamic properties of the system without altering the complexing ability of the extractant. Suitable such compounds are, in particular, compounds with an alcohol function, and especially heavy alcohols with a number of carbon atoms ranging from 4 to 15. A proportion of up to 20% by volume relative to the organic phase is generally advantageous.

The separation of the rare earth or earths from the other metallic elements is carried out by conducting the operation countercurrently, utilizing several theoretical extraction stages, each stage comprising a mixing-/decantation operation.

The aqueous phase and the organic phase are contacted at a temperature which is not critical; it generally ranges from 15° to 65° C. and most frequently from 20° to 50° C.

The separation stage results in, on the one hand, separation of an aqueous solution which contains the element or elements not extracted from the decomposition solution, i.e., cobalt and other metallic impurities, and separation of an organic phase containing the rare earth or earths.

To improve the purity of the rare earth or earths, it is desirable to carry out a washing stage prior to the back-extraction stage.

In this washing stage, the organic phase is washed with water or a dilute solution of nitric acid, less than about 0.3 N.

Subsequently, a back-extraction stage of the rare earth or earths contained in the extraction solvent is carried out.

The rare earth or earths extracted in the organic phase are separated by contacting the latter with water, or optionally a dilute solution of nitric acid, less than about 0.3 N.

Following the separation of the aqueous phase and the organic phase, the rare earth or rare earths are concentrated in the aqueous phase in the form of rare earth nitrate or nitrates, while the extraction solvent may be recycled into the extraction stage.

According to the present invention, the rare earth or earths may be recovered from said solution in the form of their oxides.

For this purpose, the precipitation of the rare earth or earths contained in the aqueous phase, in the form of hydroxides, carbonates or oxalates, is carried out, and the separated precipitate is subjected to a heat treatment.

Depending on the particular case, an aqueous solution of an alkali metal or ammonium hydroxide, alkali metal or ammonium carbonate, alkali metal or ammonium oxalate or of oxalic acid, is used.

The preferred precipitating agents are ammonia, ammonium carbonate or oxalate, or oxalic acid.

The amount of the precipitating agent is at least equal to the stoichiometric amount of the nitrate or nitrates of rare earths, but preferably a slight excess of up to 20% of the stoichiometric amount is used.

The precipitation is carried out in conventional manner, employing the conditions described in the literature.

A precipitate of a hydroxide or hydroxides, or carbonates or oxalates of a rare earth or of rare earths, is recovered.

The precipitate is separated according to conventional methods of separation, such as filtration, centrifugation, draining or settling.

The precipitate may optionally be subjected to an operation of washing with water and, subsequently, the separated precipitate is calcined.

According to the invention, the rare earth or rare earths are recovered in the form of their oxides with a very good yield, which may be higher than 95%, and a purity higher than 99%.

An alternate embodiment of the process of the invention comprises recovering the cobalt from the aqueous solution exhausted of rare earth or earths and produced in the extraction stage. It contains the element or elements not extracted from the decomposition solution, i.e., cobalt and the other metallic impurities.

To recover the cobalt in the form of the oxide, it is precipitated in the form of the oxalate and then the precipitate is subjected to a heat treatment.

The cobalt oxalate is precipitated by treating the solution of the cobalt nitrate and of the other metallic impurities with an aqueous solution of oxalic acid or an oxalate of an alkali metal or of ammonium.

The cobalt is selectively precipitated in the form of the oxalate, relative to the impurities consisting of a transition metal or of transition metals.

However, if one or several alkaline earth metal ions (in particular $Ca^{++}$) are present among the impurities, it appears necessary to first eliminate them by precipitating them, for example, in the form of the fluoride.

As the precipitating agent, an aqueous solution of an alkali metal fluoride, preferably sodium fluoride or ammonium fluoride, is used.

The precipitation is carried out in a manner known to this art.

A fluoride precipitate or fluoride precipitates of one or several alkaline earth metals are obtained, which are then separated by known techniques of solid/liquid separation.

According to this invention, if necessary, the alkaline earth metal ions, particularly calcium ions, are eliminated, whereupon the cobalt is precipitated in the form of the oxalate.

As described above relative to the preparation of one or several rare earth oxides, the cobalt oxalate is separated, optionally washed and then calcined.

Utilizing the process of the invention, the cobalt is recovered with a very good yield, which may be higher than 95%, with a purity higher than 98%.

In order to further illustrate the present invention and the advantages thereof, the following specific example is given, it being understood that same is intended only as illustrative and in nowise limitative.

EXAMPLE (a) The residue treated in this Example was in the form of a moist black powder, the analysis by weight of which was as follows:

| (i)   | water = 16.5%  |        |        |         |        |          |         |
|-------|----------------|--------|--------|---------|--------|----------|---------|
| (ii)  | cobalt = 48.3% |        |        |         |        |          |         |
| (iii) | rare earths = 27.2%, of which, | | | samarium | 20.9% | | |
|       |                |        |        | lanthanum | 0.8% | | |
|       |                |        |        | neodymium | 3.9% | | |
|       |                |        |        | praseodymium | 0.6% | | |
|       |                |        |        | other rare earths | 1.0% | | |
| (iv)  | impurities = 8%, of which: | | | | | | |
|       | calcium:       | 1.5%   | nickel: | 0.09 | aluminum: | 0.075% |
|       | sodium:        | 0.065% | iron:   | 0.13% | zinc:     | 0.016% |
|       | silicon:       | 0.12%  | copper: | 0.03% | | |

(b) In a first stage, the decomposition of the residue with nitric acid was carried out.

Per 1 kg of the above powder, 2.8 kg concentrated 65% nitric acid (about 14 N) were used. The powder was added to the nitric acid and the reaction was permitted to proceed, while maintaining a temperature of 70° C. for 1 h.

The volume of the solution was adjusted to 2.8 liter and was filtered.

An insoluble, not decomposed residue was recovered in this manner, which essentially consisted of silicates and weighed 32 g after drying.

After filtering, therefore, a clear aqueous solution having the following composition was obtained:
Cobalt: 170 g/l
Rare earths: 96 g/l (samarium: 74 g/l)
Ammonium nitrate: 78 g/l
Residual acidity: 0.3 N (c) This solution was then subjected to the liquid/liquid extraction operation carried out in the manner shown in the FIGURE of Drawing.

The apparatus used comprised a multi-stage battery of the mixer/decanter type, operating countercurrently, and consisting of an extraction (a) and washing (a') section containing 10 theoretical stages, and a back-extraction section (b) for the rare earths extracted in the organic phase, containing 5 theoretical stages.

The extraction agent used was tri-n-butylphosphate. It was diluted in a proportion of 60% by volume in kerosene. This mixture was the extraction solvent.

The aqueous solution issuing from the residue decomposition stage was introduced via line 1 into the fifth stage of the battery, at a rate of 1 liter/h.

At inlet 2, the extraction solvent was introduced at a rate of 1 liter/h.

Acidified water ($HNO_3$, 0.1 N) was introduced into the washing section at a rate of 0.1 l/h, at inlet 3.

At 4, at the inlet of the extraction section, a cobalt nitrate solution containing 152 g/l cobalt and 70 g/l ammonium nitrate, was recovered.

At the outlet of the back-extraction section, via line 5, water was countercurrently introduced into the organic phase, at a rate of 0.8 l/h.

Via line 6, the purified rare earth nitrate solution was recovered.

(d) This solution was treated by the addition of oxalic acid to recover the rare earths.

Per liter of the purified solution, 200 g oxalic acid (COOH)$_2$, 2.H$_2$O, were added.

A rare earth oxalate was thereby precipitated, which was separated by filtration and then calcined for 3 h at 850° C.

308 g of a rare earth oxide were recovered in this manner per 1 kg of the initial residue, said oxide having the following composition:

Sm$_2$O$_3$: 76.8%
La$_2$O$_3$: 2.9%
Nd$_2$O$_3$: 14.3%
Pr$_6$O$_{11}$: 2.2%
Other RE$_2$O$_3$: 3.8%
Cobalt: <100 ppm
Iron: <50 ppm
Nickel: <50 ppm
Aluminum: <50 ppm
Zinc: <50 ppm
Calcium: <50 ppm
Silicon: <50 ppm The yield of the recovery of rare earth was higher than 97.5%.

(e) The cobalt nitrate solution was treated to recover the cobalt.

Sodium fluoride (20 g NaF per liter of solution) was added to this solution and calcium fluoride was precipitated, which was separated by filtration.

Cobalt was precipitated from the purified solution by the addition of 400 g oxalic acid per liter of solution.

After filtering the cobalt oxalate and calcination, 630 g cobalt oxide were recovered per 1 kg of the initial residue, said oxide having the following composition:
RE$_2$O$_3$: <100 ppm
Calcium: <100 ppm
Sodium, nickel: <100 ppm
Copper: <100 ppm
Iron, silicon: <50 ppm The cobalt recovery yield was 95.7%.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the separation and recovery of rare earth and cobalt values from a residue material containing same, which comprises (a) dissolving such residue with nitric acid, (b) liquid/liquid extracting the resulting aqueous nitric phase with an organic phase comprising at least one water-insoluble neutral organophosphoric extractant, whereby the rare earth values are transferred into said organic phase, and (c) recovering said rare earth values from the organic phase.

2. The process as defined by claim 1, said residue material comprising particulates having diameters of less than 2 mm.

3. The process as defined by claim 1, wherein the nitric acid of solubilization is used in an amount of up to a 30% excess of the stoichiometric amount.

4. The process as defined by claim 3, comprising dissolving the residue with 6 N to 15 N aqueous nitric acid.

5. The process as defined by claim 3, wherein the temperature of dissolution ranges from 15° to 100° C.

6. The process as defined by claim 1, wherein said resulting aqueous phase comprises a nitrate ion concentration of from 100 g/l to 600 g/l.

7. The process as defined in claim 6, wherein the nitrate ion concentration ranges from 300 g/l to 600 g/l.

8. The process as defined in claim 1, said at least the water-insoluble neutral organophosphoric extractant having one of the following formulae:

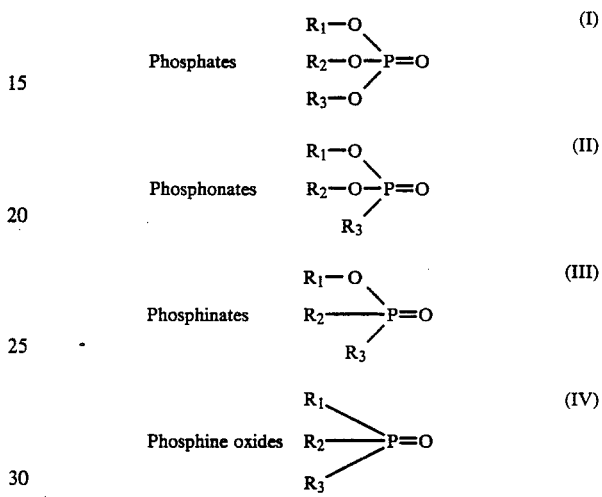

wherein R$_1$, R$_2$ and R$_3$, which may be identical or different, are each a hydrocarbon radical having from 1 to 18 carbon atoms, with the proviso that at least one of such radicals has 4 carbon atoms.

9. The process as defined by claim 8, said at least one water-insoluble neutral organophosphoric extractant comprising tri-n-butylphosphate (TBP), tri-isobutylphosphate (TIBP), dibutylbutylphosphonate (DBBP), di-(2-ethylhexyl)-2-ethylhexylphosphonate (DEHEHP), or tri-n-octylphosphine oxide (TOPO).

10. The process as defined by claim 8, said at least one water-insoluble nheutral organophosphoric extractant comprising tributylphosphate.

11. The process as defined by claim 1, said organic phase further comprising at least one organic diluent.

12. The process as defined by claim 11, said at least one organic diluent comprising an aliphatic hydrocarbon, or a petroleum fraction of kerosene or Solvesso type.

13. The process as defined by claim 12, said at least one organic diluent comprising a petroleum fraction of kerosene type.

14. The process as defined by claim 1, further comprising washing the organic phase of liquid/liquid extraction with water, or a dilute, less than about 0.3 N aqueous nitric acid solution.

15. The process as defined by claim 1, further comprising back-extracting the organic phase of liquid/liquid extraction with water, or a dilute, less than about 0.3 N aqueous nitric acid solution, whereby the rare earth values are transferred into the second aqueous phase.

16. The process as defined by claim 15, comprising recovering rare earth nitrates from said second aqueous phase.

17. The process as defined by claim 15, comprising precipitating the rare earth values in hydroxide, carbonate or oxalate form, and calcining the precipitate into oxide state.

18. The process as defined by claim 1, comprising recovering cobalt values from the aqueous phase of liquid/liquid extraction.

19. The process as defined by claim 18, comprising precipitating cobalt oxalate values and calcining the precipitate into oxide state.

20. The process as defined by claim 19, comprising precipitating alkaline earth metal fluoride value from said aqueous phase prior to precipitating said cobalt oxalate values.

21. The process as defined by claim 1, said residue material comprising a waste fraction from the production of samarium/cobalt or rare earth/cobalt magnets.

22. The process as defined by claim 21, said waste fraction comprising from 10% to 50% of rare earth values and from 30% to 80% of cobalt values, with any complement to 100% comprising impurities.

* * * * *